US008169957B2

(12) United States Patent
Damnjanovic

(10) Patent No.: US 8,169,957 B2
(45) Date of Patent: May 1, 2012

(54) FLEXIBLE DTX AND DRX IN A WIRELESS COMMUNICATION SYSTEM

(75) Inventor: Aleksandar Damnjanovic, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 790 days.

(21) Appl. No.: 12/024,849

(22) Filed: Feb. 1, 2008

(65) Prior Publication Data

US 2008/0186892 A1 Aug. 7, 2008

Related U.S. Application Data

(60) Provisional application No. 60/888,279, filed on Feb. 5, 2007.

(51) Int. Cl.
*H04W 4/00* (2009.01)
*H04B 7/185* (2006.01)
*H04B 7/00* (2006.01)

(52) U.S. Cl. ......... 370/329; 370/318; 370/437; 455/522

(58) Field of Classification Search .................. 370/328
See application file for complete search history.

(56) References Cited

U.S. PATENT DOCUMENTS 6,496,700 B1 12/2002 Chawla et al.
6,987,982 B2 1/2006 Willenegger et al.
7,239,884 B2 7/2007 Khawand et al.
7,349,371 B2 3/2008 Schein et al.
7,551,546 B2 6/2009 Ma et al.
2002/0052204 A1 5/2002 Bender et al.
2002/0064145 A1* 5/2002 Khare et al. .................. 370/342
2003/0086381 A1* 5/2003 Terry et al. .................... 370/280
2003/0152034 A1 8/2003 Zhang et al.
2004/0082356 A1 4/2004 Walton et al.
2004/0160916 A1 8/2004 Vukovic et al.

(Continued)

FOREIGN PATENT DOCUMENTS

EP 1505847 A1 2/2005

(Continued)

OTHER PUBLICATIONS

"Requirements on DRX/DTX control in LTE", Nov. 6-10, 2006, 3GPP TSG RAN WG2 #56.*

(Continued)

*Primary Examiner* — Andrew Chriss
(74) *Attorney, Agent, or Firm* — Darrell Scott Juneau; Nerrie M. Zohn

(57) ABSTRACT

A data traffic responsive battery-saving approach for a wireless user equipment (UE) device such as an data packet capable cellphone incorporates flexible discontinuous transmission and reception (DTX-DRX) when in Long Term Evolution (LTE) active mode as dictated by an evolved radio access network (RAN) such as an evolved base node (eNode B). A UE device requests are made on unsynchronized random access channel (RACH). Lengthening a duration of DRX and reducing requirements for synchronization uplink transmissions results in power savings of up to 75%, as well as creating opportunities for reducing interference and for allocating additional time slots for data. This power savings is compatible with other downlink scheduling proposals, with control channel-less Voice-over-IP (VoIP), and need not target those UE devices in bad radio conditions. Legacy UE devices that can interact with the eNode B by being capable of radio resource control (RRC) signaling continue to be compatible.

20 Claims, 10 Drawing Sheets

U.S. PATENT DOCUMENTS

| | | | | |
|---|---|---|---|---|
| 2004/0190471 | A1 | 9/2004 | Bender et al. | |
| 2005/0014508 | A1 | 1/2005 | Moulsley et al. | |
| 2005/0195852 | A1 * | 9/2005 | Vayanos et al. | 370/437 |
| 2005/0221833 | A1 * | 10/2005 | Granzow et al. | 455/450 |
| 2005/0259624 | A1 | 11/2005 | Proctor, Jr. | |
| 2006/0018336 | A1 | 1/2006 | Sutivong et al. | |
| 2006/0094478 | A1 * | 5/2006 | Kim et al. | 455/574 |
| 2006/0209701 | A1 | 9/2006 | Zhang et al. | |
| 2007/0047493 | A1 | 3/2007 | Park et al. | |
| 2007/0109987 | A1 * | 5/2007 | Kohlmann et al. | 370/318 |
| 2007/0147326 | A1 | 6/2007 | Chen | |
| 2007/0183355 | A1 * | 8/2007 | Kuchibhotla et al. | 370/318 |
| 2007/0291728 | A1 * | 12/2007 | Dalsgaard et al. | 370/347 |
| 2008/0102880 | A1 * | 5/2008 | Gholmieh et al. | 455/522 |
| 2008/0159183 | A1 * | 7/2008 | Lindoff et al. | 370/278 |
| 2008/0167089 | A1 * | 7/2008 | Suzuki et al. | 455/574 |
| 2008/0279257 | A1 | 11/2008 | Vujcic et al. | |

FOREIGN PATENT DOCUMENTS

| | | | |
|---|---|---|---|
| JP | 2003333661 | A | 11/2003 |
| JP | 2006352708 | A | 12/2006 |
| KR | 1020010075225 | | 8/2001 |
| RU | 2005102606 | | 8/2005 |
| TW | 200305318 | | 10/2003 |
| TW | 200501678 | | 1/2005 |
| TW | 200704037 | | 1/2007 |
| WO | WO9921375 | A2 | 4/1999 |
| WO | WO0056107 | A1 | 9/2000 |
| WO | WO2004013845 | A1 | 2/2004 |
| WO | WO2004038951 | | 5/2004 |
| WO | WO2004107630 | | 12/2004 |
| WO | WO2005120002 | | 12/2005 |
| WO | WO2007092896 | | 8/2007 |

OTHER PUBLICATIONS

"Views on DRX/DTX control in LTE", Nov. 6-10, 2006, 3GPP TSG RAN WG2 #56.*

Nokia: "Active Mode DRX" 3GPP TSG-RN WG2 Meeting #55, R2-062752, Oct. 9-13, 2006, Seoul, Korea, pp. 1-3.

Nokia: "Active Mode DRX Details" 3GPP TSG-RAN WGX Meeting #55, R2-062753, Oct. 9-13, 2006, Seoul, Korea pp. 1-10.

NTT DoCoMo, Inc.: "Views on DRX/DTX Control in LTE" 3GPP TSG-RAN WG2 #56, R2-063397, Nov. 6-10, 2006, Riga, Latvia, pp. 1-3.

International Search Report—PCT/US08/053044, International Search Authority—European Patent Office, Sep. 18, 2008.

Written Opinion—PCT/US08/053044, International Search Authority—European Patent Office, Sep. 18, 2008.

Taiwanese Search Report—096104420—TIPO—Jan. 25, 2011.

Tomcik.: IEEE 802.20 Working Group on Mobile Broadband Wireless Access, MBTDD Wideband Mode Performance Report 2, IEEE C802-05/88r1, pp. 49-51, Jan. 6, 2006.

Translation of Office Action in Korean application 2008-7021813 corresponding to U.S. Appl. No. 11/671,997, citing KR1020010075225 and US20060209701 dated Jan. 28, 2011.

Moore M. and others, Telecommunications: A Beginner's Guide, Hill Associates, Inc., McGraw-Hill Companies, U.S.A., Apr. 2002, p. 466.

QUALCOMM Europe, "Characteristics of UL Access Channel 1", 3GPP TSG-RAN WG1 LTE Ad Hoc, R1-060181, Jan 25, 2006, pp. 1-3.

Taiwan Search Report—TW097104924—TIPO—Jul. 20, 2011.

* cited by examiner

FLEXIBLE DTX AND DRX IN A WIRELESS COMMUNICATION SYSTEM

CLAIM OF PRIORITY UNDER 35 U.S.C. §119

The present Application for Patent claims priority to Provisional Application No. 60/888,279 entitled "A METHOD AND APPARATUS FOR USING FLEXIBLE DTX AND DRX IN A WIRELESS COMMUNICATION SYSTEM" filed Feb. 5, 2007, and assigned to the assignee hereof and hereby expressly incorporated by reference herein.

FIELD OF INVENTION

The present description pertains to discontinuous transmission and reception by a mobile communication device with a radio access network for power savings.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

In a communication system, the network consists of several base stations, each one of which communicates with one or more access terminals. Typical paging messages from the network are sent from a set of base stations (paging area) where the network determines that the mobile terminal is likely to be present. The area where pages are sent is called a paging area. The network resources required for paging increase with increase in the paging area. Thus, it is a desirable to minimize the paging area. The paging area is typically decided based on registrations, where the mobile terminal communicates its current position to the network.

In a wireless communication system, registration is the process by which the mobile terminal (i.e. access terminal) notifies the network of its location, status, ID, and other characteristics. The registration process allows the network to know how to find the access terminal so that it can page the access terminal when there is an incoming voice or data call. In order to conserve power (i.e. battery life) the access terminal enters into a power save mode. Another method is to reduce the number of times an access terminal registers with the network. The act of registration requires the access terminal to exit the power save mode and set up recourses to communicate with the base station.

Traditional methods attempt to conserve power by reducing frequency of registration. This may work well for those access terminals that are not mobile or stationary. However, reducing registration equates to the network increasing its resource to page the access terminal to ensure that the access terminal will receive a page, since the access terminal may be mobile (for example, traveling from one base station to another) within the network.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with a base node directing flexible discontinuous radio communication over a changed time interval to enhance power saving of a user equipment (UE) when data transmission is infrequent. Scheduling is simplified by having the UE automatically revert to nominal discontinuous time interval after the changed interval has elapsed.

In one aspect, a method is provided for reducing power consumption by varying user equipment discontinuous communication of reception on a downlink channel or transmission on an uplink channel with a base node. A downlink channel is specified for a changed interval for discontinuous communication scheduling for a user equipment. Uplink channel resources are scheduled in accordance with the changed interval. Communication with the user equipment following the changed interval automatically reverts to a nominal interval.

In another aspect, at least one processor is configured to reduce power consumption by varying user equipment discontinuous communication of reception on a downlink channel or transmission on an uplink channel with a base node. A first module is for specifying on a downlink channel a changed interval for a discontinuous communication scheduling for a user equipment. A second module is for scheduling uplink channel resources in accordance with the changed interval. In addition, a third module is for participating in communication with the user equipment following the changed interval at a nominal interval automatically reverted to by the user equipment.

In an additional aspect, a computer program product is provided for reducing power consumption by varying user equipment discontinuous communication of reception on a downlink channel or transmission on an uplink channel with a base node, comprising. To that end, a computer-readable medium has sets of codes configured to cause a computer to specify on a downlink channel a changed interval for a discontinuous communication scheduling for a user equipment, to schedule uplink channel resources in accordance with the changed interval, and to cause the computer to participate in communication with the user equipment following the changed interval at a nominal interval automatically reverted to by the user equipment.

In a further aspect, an apparatus is provided for reducing power consumption by varying user equipment discontinuous communication of reception on a downlink channel or transmission on an uplink channel with a base node. To that end, means are provided for specifying on a downlink channel a changed interval for a discontinuous communication scheduling for a user equipment. In addition, means are provided for scheduling uplink channel resources in accordance with the changed interval. Furthermore, means are provided for participating in communication with the user equipment following the changed interval at a nominal interval automatically reverted to by the user equipment.

In yet another aspect, a method is provided for reducing power consumption by varying user equipment discontinuous communication of reception on a downlink channel or transmission on an uplink channel with a base node. A changed interval for a discontinuous communication scheduling for a user equipment is received on a downlink channel. Uplink channel resources are scheduled in accordance with the changed interval. Then automatic reverting to a nominal communication interval occurs following the changed interval.

In yet a further aspect, at least one processor is configured to reduce power consumption by varying user equipment discontinuous communication of reception on a downlink channel or transmission on an uplink channel with a base node. To that end, modules are provided for receiving on a downlink channel a changed interval for a discontinuous communication scheduling for a user equipment, for scheduling uplink channel resources in accordance with the changed interval, and for automatically reverting to a nominal communication interval following the changed interval.

In yet an additional aspect, a computer program product is provided for reducing power consumption by varying user equipment discontinuous communication of reception on a downlink channel or transmission on an uplink channel with a base node. To that end, a computer-readable medium sets of codes configured to cause a computer to receive on a downlink channel a changed interval for a discontinuous communication scheduling for a user equipment, to schedule uplink channel resources in accordance with the changed interval, and to automatically reverting to a nominal communication interval following the changed interval.

In yet an additional aspect, an apparatus is provided for reducing power consumption by varying user equipment discontinuous communication of reception on a downlink channel or transmission on an uplink channel with a base node. Means are provided for receiving on a downlink channel a changed interval for a discontinuous communication scheduling for a user equipment. In addition, means are provided for scheduling uplink channel resources in accordance with the changed interval. Furthermore, means are provided for automatically reverting to a nominal communication interval following the changed interval.

In another aspect, an apparatus is provided for reducing power consumption by varying user equipment discontinuous communication of reception on a downlink channel or transmission on an uplink channel with a base node. An uplink radio transmitter and a downlink radio receiver are utilized by a scheduling component for receiving a specification on a downlink channel for a changed interval for discontinuous communication scheduling for a user equipment, for scheduling uplink channel resources in accordance with the changed interval, and for participating in communication with the base node following the changed interval at a nominal interval automatically reverted to by the user equipment.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
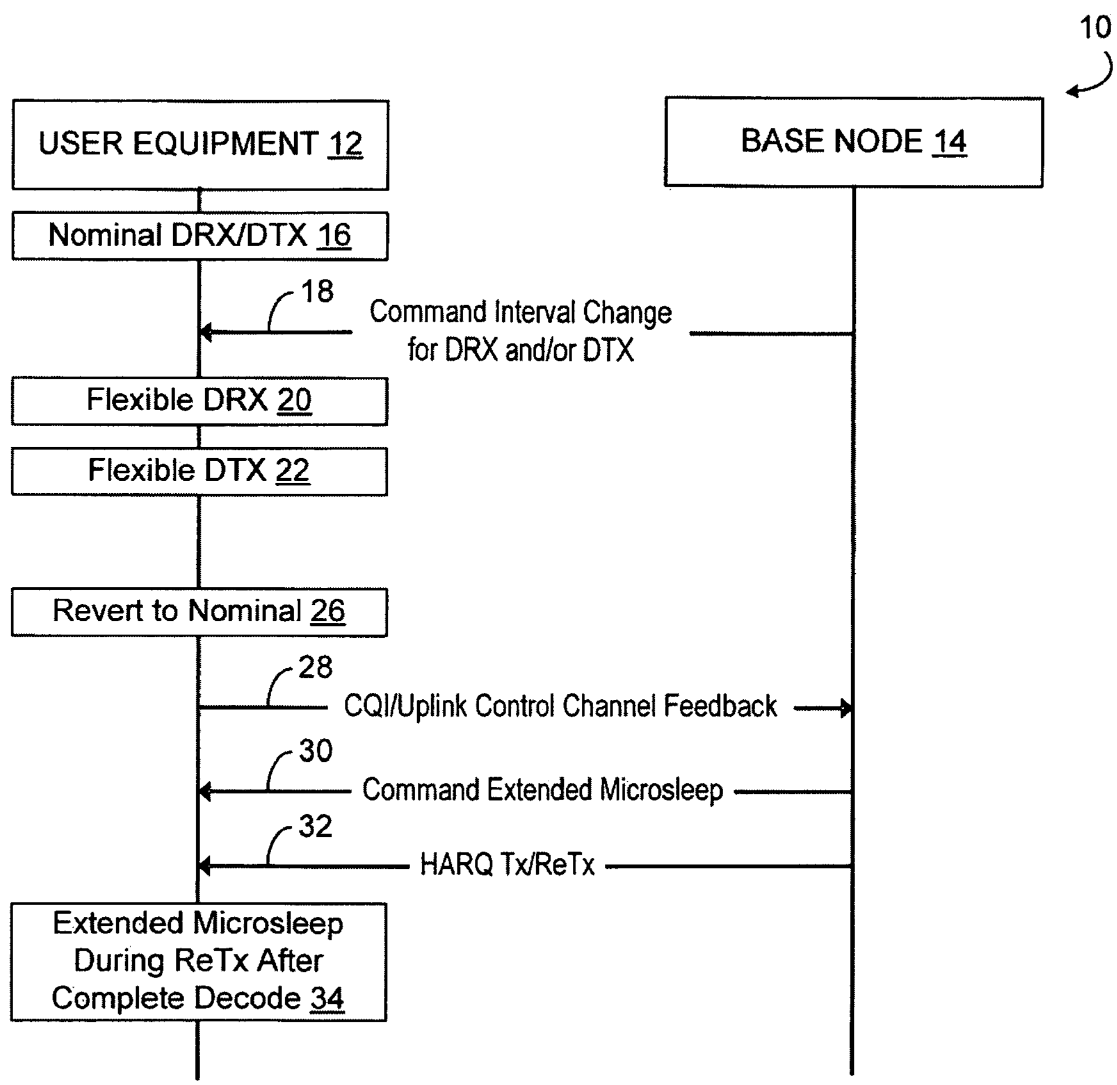
FIG. 1 illustrates a flow diagram of a methodology for a base node of a communication system to direct a user equipment (UE) to change discontinuous reception and/or transmission with automatic reversion and extended microsleep in order to optimize a communication channel and/or to extend battery service life of the UE.

A data traffic responsive battery-saving approach for a wireless user equipment (UE) device such as a data packet capable cellphone incorporates flexible discontinuous transmission and reception (DTX-DRX) when in Long Term Evolution (LTE) active mode as dictated by an evolved radio access network (RAN) such as an evolved base node (eNode B). Lengthening duration of DRX and reducing requirements for synchronization uplink transmissions results in power savings of about 75%, as well as creating opportunities for reducing interference and for allocating additional time slots for data. This power savings is compatible with other downlink scheduling proposals, with control channel-less Voice-over-IP (VoIP), and need not target UE devices in bad radio conditions. Legacy UE devices that can interact with the eNode B by radio resource control (RRC) signaling continue to be compatible.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms “component”, “module”, “system”, and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word “exemplary” is used herein to mean serving as an example, instance, or illustration. Any aspect or design described herein as “exemplary” is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term “article of manufacture” (or alternatively, “computer program product”) as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Referring initially to FIG. 1, a communication system 10 has a user equipment (UE) 12 that is advantageously able to extend its battery service life as directed by a base node 14. As depicted at 16, the UE 12 is operating in a nominal discontinuous reception (DRX)/discontinuous transmission (DTX) mode wherein certain components can be placed in a sleep mode when reception/transmissions are not scheduled. Upon receipt of a command from the base node 14 to change the interval for power savings (i.e., DRX and/or DTX) as depicted at 18, the UE adopts the changed scheduling. This can entail flexible DRX as depicted at 20. It should be appreciated that the interval change could be a reduced interval as compared to nominal DRX. In an illustrative implementation, the DRX is an extended interval providing power savings by ignoring nominally scheduled reception periods. This extension can be a predetermined multiple of nominal DRX intervals, a specified multiple, and/or another directed interval.

Alternatively or in addition, as depicted at 22, the command can change the uplink control channel feedback (e.g., channel quality indicator (CQI)), such as increasing the interval until the next transmission by the UE 12. In an illustrative implementation, the DRX and DTX are aligned such that power saving benefits are optimized with increased opportunities for completely powering down radio frequency circuitry. Upon completion of the commanded interval, the UE 12 automatically reverts to the nominal DRX/DTX, as depicted at 26. Thus, the base node 14 has less overhead to have to command the reversion, nor are there as many difficulties scheduling UEs 12 in poor reception situations. The UE 12 thus performs its uplink control channel feedback (e.g., CQI) as depicted at 28. The base node 14 can command another interval change at this point or permit continued nominal scheduling.

As depicted at 30, the base node 14 can command extended microsleep. In an illustrative implementation utilizing HARQ, as depicted at 32, a series of transmissions (Tx) and retransmissions (ReTx) are made in order to download successfully a plurality of packets of a communication. For certain types of transmissions such as Voice Over IP (VoIP), the UE 12 may not need to listen to each of the interleaved scheduled downlink in order to successfully download the communication and thus can microsleep by going immediately back to sleep upon complete decode, as depicted at block 34.

Figure 2:
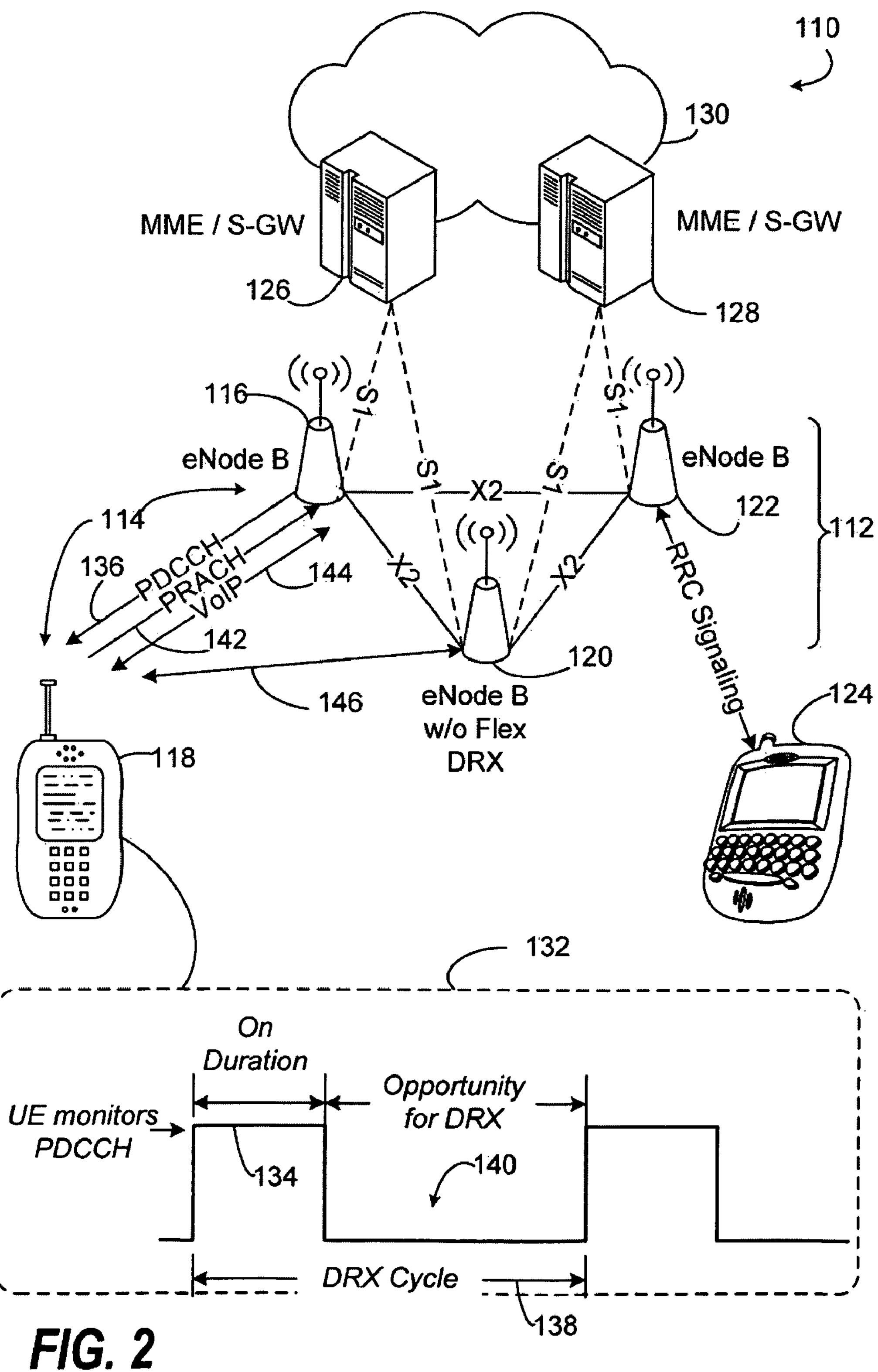
FIG. 2 illustrates a block diagram of a communication system for flexible discontinuous transmission and reception (DTX-DRX) by a user equipment (UE) device.

Referring to FIG. 2, in one aspect, a communication system 110 includes an evolved Universal Mobile Telecommunications System (UMTS) Terrestrial Radio Access Network (E-UTRAN) 112 that incorporates a flexible DTX-DRX (discontinuous transmission-discontinuous reception) power saving system 114 between at last one radio access network (RAN), depicted as an evolved base node (eNode B) 116 and a user equipment (UE) device 118. Another in-range eNode B 120 for multiple input multiple output (MIMO) communications is depicted as not being capable of flexible DTX-DRX. Yet a third eNode B 122 is depicted as being out of range of UE device 118 but within range of a legacy UE device 124 that is compatible by being capable of radio resource control (RRC) signaling but does not take advantage of flexible DTX-DRX.

The eNode Bs 116, 120, 122 provide an UMTS Terrestrial Radio Access (E-UTRA) user plane and control plane (RRC) protocol terminations towards the UEs 118, 124. The user plane can comprise of 3GPP (3rd Generation Partnership Project) Packet Data Convergence Protocol (PDCP), radio link control (RLC), medium access control (MAC) and physical layer control (PHY). The eNode Bs 116, 120, 122 are interconnected with each other by means of X2 interface (“X2”). The eNode Bs 116, 120, 122 are also connected by means of an S1 interface (“S1”) to an EPC (Evolved Packet Core), more specifically to mobility management entities/ serving gateways (MME/S-GW) 126, 128 connected to a data packet network 130. The S1 interface supports a many-to-many relation between MMEs/S-GW 126, 128 and eNode Bs 116, 120, 122.

The eNode Bs 116, 120, 122 hosts the following functions: radio resource management: radio bearer control, radio admission control, connection mobility control, dynamic allocation of resources to UEs in both uplink and downlink (scheduling); IP header compression and encryption of user data stream; selection of an MME at UE attachment; routing of user plane data towards serving gateway; scheduling and transmission of paging messages (originated from the MME); scheduling and transmission of broadcast information; and measurement and measurement reporting configuration for mobility and scheduling.

The MME hosts the following functions: distribution of paging messages to the eNodes Bs 116, 120, 122; security control; idle state mobility control; System Architecture Evolution (SAE) bearer control; ciphering and integrity protection of Non-Access Stratum (NAS) signaling.

The Serving Gateway hosts the following functions termination of U-plane packets for paging reasons and switching of U-plane for support of UE mobility.

As depicted at 132, the UE device 118 performs flexible DTX-DRX power saving. Active time is when the UE device 118 is awake. When DRX is configured by higher layer, this active time includes an "On Duration" period 134, which is the time UE is continuously monitoring physical downlink control channel (PDCCH) 136 while a DRX inactivity timer has not expired and the time UE device 118 is continuously monitoring the PDCCH while a DRX retransmission timer has not expired.

The DRX inactivity timer specifies the number of consecutive transmission time intervals (TTIs) during which the UE device 118 monitors the PDCCH 136 after successfully decoding a PDCCH indicating an initial upload (UL) or download (DL) user data transmission for this UE device 118. The DRX retransmission timer specifies the number of consecutive TTIs that the UE device 118 shall monitor the PDCCH 136 for as soon as a DL retransmission is expected by the UE device 118. A DRX cycle depicted at 138 specifies the periodic repetition of the On Duration period 134 followed by a possible period of inactivity ("Opportunity for DRX"), depicted at 140. A DRX short cycle timer is a parameter that specifies the number of consecutive TTIs that the UE device 118 shall follow the short DRX cycle after the DRX inactivity timer has expired. A Hybrid Automatic-Repeat-Request (HARQ) Radio Transmission Technology (RTT) Timer is a parameter that specifies the minimum amount of TTIs before a DL HARQ retransmission is expected by the UE device 118. An On Duration timer specifies the number of consecutive TTIs during which the UE 118 shall monitor the PDCCH 136 for possible allocations. The On Duration timer is a part of a DRX Cycle 138. A Random Access Radio Network Temporary Identifier (RA-RNTI) can be used on the PDCCH 136 when random access response messages are transmitted. It unambiguously identifies which time-frequency resource is to be utilized by the UE device to transmit a random access preamble.

The UE device 118 transmits random access messages on a packet random access channel (PRACH) 142 that advantageously need not be synchronized when the UE device 118 comes out of an idle mode. This capability can be utilized in a small number of instances in which extended DRX results in loss of synchronization in order to make upload requests. It should be appreciated with benefit of the present disclosure that control channel-less VoIP channel 144 is supported by flexible DTX-DRX. Should the flexible DTX-DRX UE device 118 communicate with the eNode B 120 that does not support flexible DRX as depicted at 146, the UE device 118 can still realize benefits of regular DRX power savings.

Figure 3:
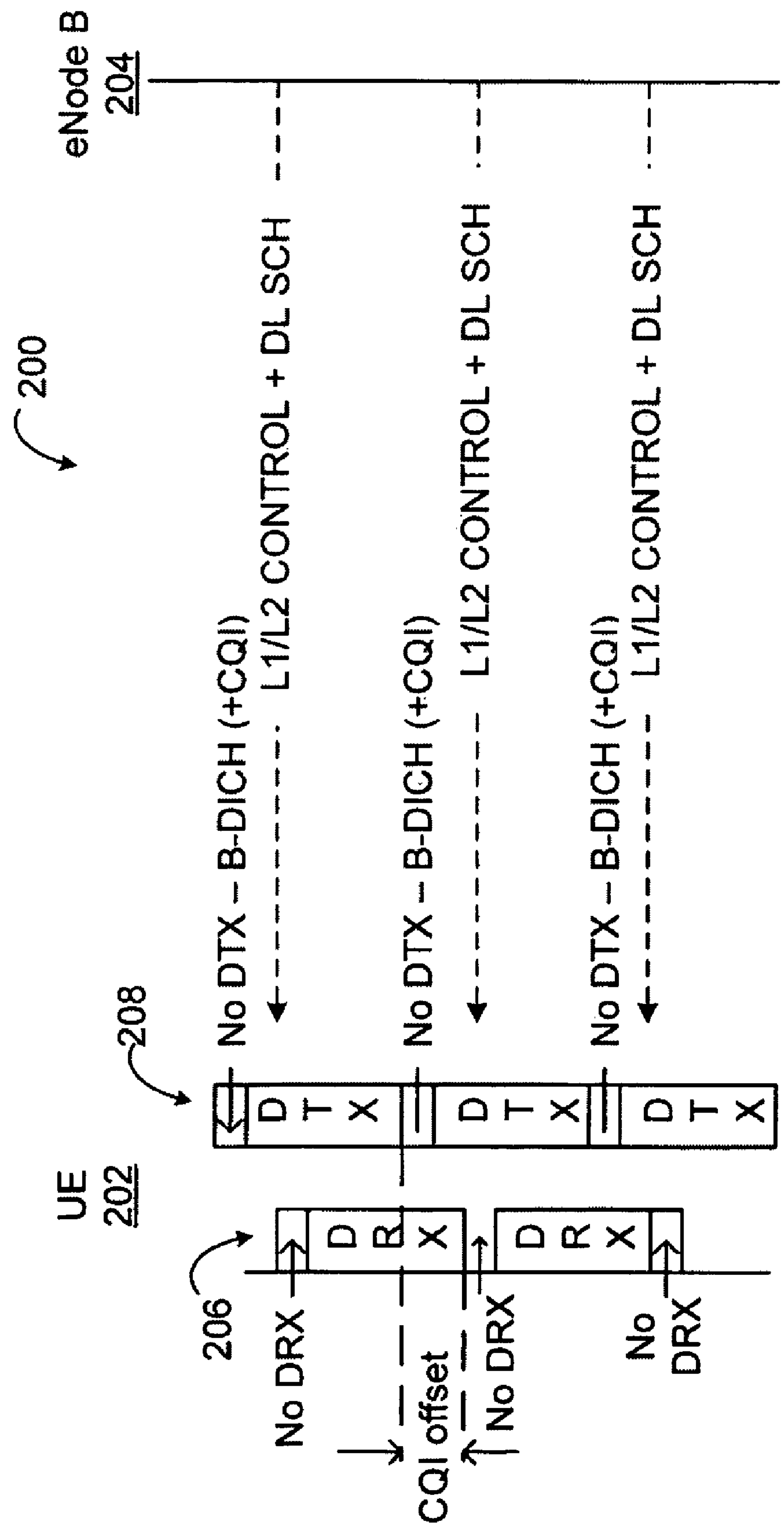
FIG. 3 illustrates a timing diagram of DTX-DRX communication messages between an eNode B and a UE device of FIG. 1.

In FIG. 3, a timing diagram 200 between a UE device 202 and an eNode B 204 during "RRC CONNECTED state" depicts at 206 reception by the UE device 202 and depicts at 208 transmission by the UE device 202. The reception 206 is delayed with respect to the transmission 208 by a channel quality indicator (CQI) offset that accommodates the channel path delays related to distance from the eNode B 204. The reception 206 comprises a repeating period of "No DRX" in which the PDCCH is monitored followed by a three-fold period of "DRX". Similarly, the transmission 208 comprises a repeating period of "No DTX" in which the DRX indicator channel (DICH) is used to reconfigured DRX cycle (on and off periods) and UL transmission pattern. During each period, the eNode B 204 sends L1/L2 control and DL synchronizing channel (DL-SCH) transmissions to the UE device 202 to maintain synchronization. It should be appreciated that L1 refers to Layer 1 (physical layer), L2 refers to Layer 2 (data link layer), and L3 refers to Layer 3 (network layer). During periods in which the DRX and DTX overlap, the UE device 202 has an opportunity to turn off its radio frequency (RF) circuitry for significant battery saving. Non-negligible power savings is available during non-overlapping regions when DRX or DTX only is performed. Thus, the download power control resources are contained within the PDCCH configured by the eNode B 204.

UL power control can require periodic a UL reference signal, such as reasonable rates of 50-200 bits per second with DRX indicator channel (DICH) and channel quality indicator sent on Physical uplink control channel (PUCCH), which has implications on power consumption by the UE device 102. However, an opportunity exists insofar as DRX indicator channel (DICH) and PUCCH would only be configured if proper power control is feasible or desirable. It follows that it would not be desirable to configure DRX indicator channel (DICH) and PUCCH to support timing adjustments due to poor power control. Instead, open-loop power control can be employed if UL reference signal is sent infrequently.

Timing adjustment can be deferred in many instances of large DRX cycles without loss of synchronization. Should synchronization be lost, upload (UL) requests are still possible through the unsynchronized RACH since dedicated UL slots are undesirably far apart (i.e., imposing delay) and/or constitute an undesirably large overhead. With this in mind, the basic DTX-DRX of FIG. 3 can be enhanced for additional power savings without delays/overhead shortcomings when UL request are to be initiated by the UE device 202. Thus, a single UE state can be flexibly configured for various data traffic conditions.

Figure 4:
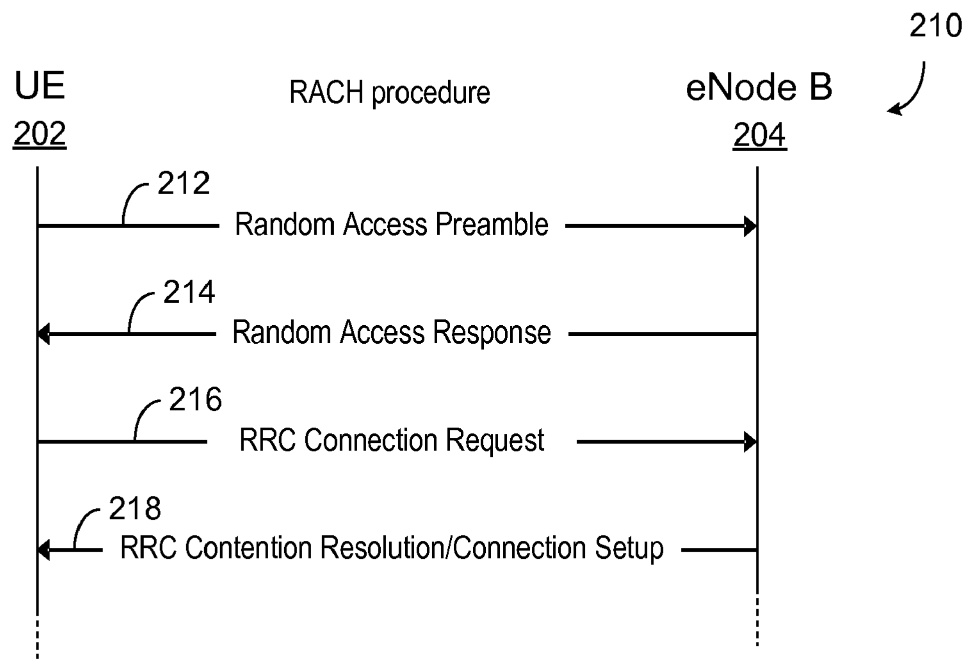
FIG. 4 illustrates a timing diagram for random access channel (RACH) upload requests by the UE device to the eNode B.

One flexible configuration would be for a short DRX interval (e.g., <20 ms). The eNode B 204 configures the DRX indicator channel (DICH) and PUCCH. The UL request by the UE device 202 is sent via the PUCCH. This rule is enforced by having the UE device 202 wait for up to 20 ms to send UL requests on PUCCH or has to utilize a RACH procedure 210, which is depicted in FIG. 4. The UE device 202 sends a random access preamble to the eNode B; 204 as depicted at 212, which responds with a random access response as depicted at 214. The UE device 202 makes an RRC connection request at 216. The eNode B 204 in turn provides an RRC contention resolution/connection setup message facilitate the communication as depicted at 218.

Another flexible configuration can be for a long DRX interval (e.g., >20 ms) in which the eNode B 204 does not configure the UL channels. Should synchronization be lost, a UL request can be sent on the RACH. The UL request is made in message 3. Nominal DRX cycles assumed by the UE supports the RACH procedure 210 in order to receive messages 2 and 4 for a subsequent UL request after transmitting an RRC measurement report message, which can include a potential timely receipt of an RRC Handover (HO) command. For closed loop power control method, the UE device 202 takes advantage of configuration information in message 4 regarding DRX indicator channel (DICH), PUCCH, and possibly DL power control resources in PDCCH unless implicitly related to DRX indicator channel (DICH).

Another flexible configuration includes increasing the DRX cycle based upon a timer mechanism. The eNode B 204 does not send any data to the UE device 202 for a configurable amount of time. Intervals before and after the timer expires can be preconfigured. The UE device 202 implicitly releases assigned DRX indicator channel (DICH) and PUCCH resources. The eNode B 204 can rely upon conservative measures for determining when these resources have been implicitly released in order to avoid detrimental impacts to power control and to UL collisions between multiple UE devices 202. The eNode B 204 transmits explicit RRC signaling.

Figure 5:
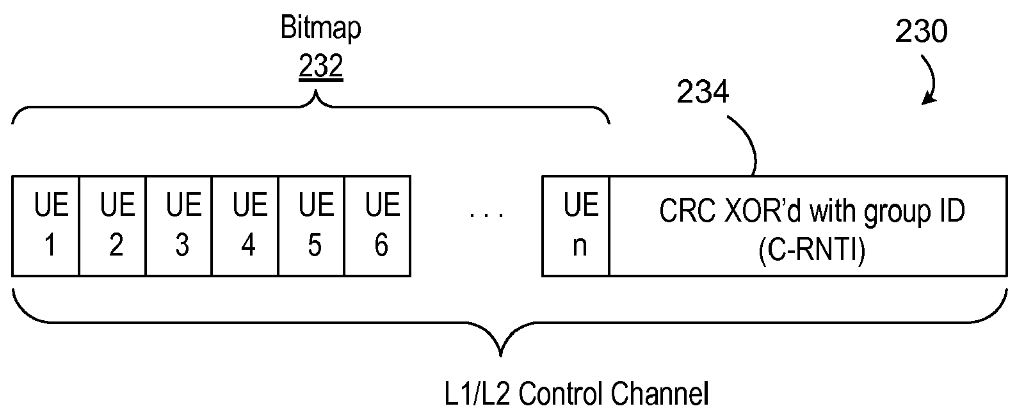
FIG. 5 illustrates a diagram of a data structure for transmission on an L1/L2 control channel by the eNode B for setting extended DRX intervals.

As depicted in FIG. 5, flexible DRX can be enhanced by utilizing L1/L2 control channel structure 230. A bitmap 232 indicates paged paging groups. A paging indication channel (PICH) identifier in place of cell radio network temporary identifier (C-RNTI) can be exclusive or'ed (XOR) on cyclic redundancy code (CRC), as depicted at 234. Possible DL-SCH resources and Modulation and Coding Scheme (MCS) can be indicated on broadcast channel (BCH).

In flexible DRX, a transmission data structure is utilized that is like PICH with Group ID used in place of C-RNTI. A bitmap associated with the UE devices gives an indication of whether extended DRX is appropriate for the corresponding UE device. In one aspect for a two-state DRX setting (i.e., nominal and extended DRX interval), a one-bit control indication (i.e., 0 and 1) can suffice with the specifics of the extended DRX interval specified by the RRC. Additional bits can be utilized for increased DRX interval options.

Figure 6:
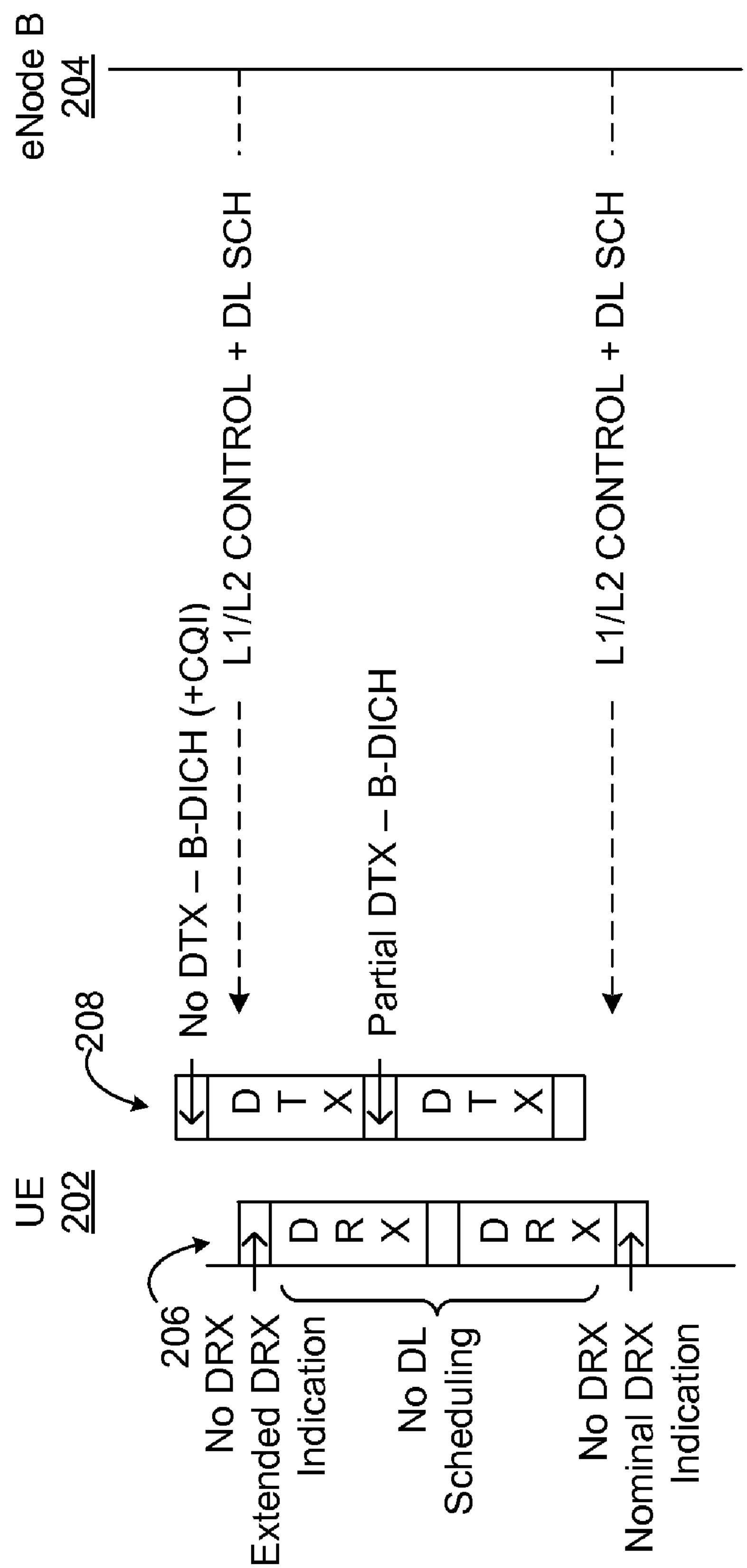
FIG. 6 illustrates a timing diagram for flexible DRX communication between a UE device and an eNode B.

In FIG. 6, the UE device 202 has entered an extended DRX cycle on the reception 206 since no DL scheduling is expected for an extended period, which has been communicated by the eNode B 204. Thus, the transmission side 208 of the UE device 202 includes a first of four 5 ms blocks in the first cycle in which No DTX is indicated so that DRX indicator channel (DICH) and CQI can be communicated to the eNode B 204. Thereafter, the UE device can go into DTX for the remaining three blocks of the cycle, allowing the UE device 202 to not maintain synchronization. During the next No DTX block, only a partial transmission is made on the DRX indicator channel (DICH), thus omitting the CQI, followed by another DTX period. On the reception side 206, the first depicted No DRX period includes receipt of L1/L2 control and DL-SCH in which the extended DRX is indicated. The UE device 202 can thus enter an extended DRX state realizing power savings until some multiples of the indicated No DRX cycles arrives, which is depicted as being an instance in which the UE device is commanded to revert to a nominal DRX cycle.

Thus, the flexible DRX interval adjusts to traffic characteristics reverting to extended DRX interval during periods of inactivity and allowing DRX even during periods of activity (e.g., VoIP with bundling can allow scheduling every 40 ms with nominal (regular) DRX interval as small as 5 ms such as for synchronizing HARQ with 5 ms instances).

Having a nominal DRX interval setting adds robustness for instances in which a UE device does not decode the L1/L2 control channel bitmap. Thus, there is no imperative to target UE devices in very bad radio conditions since the implication is merely reduced optimization of power savings with a corresponding reduction in battery service life. It should be appreciated that less DL overhead is required as compared to other alternatives. This flexible DRX power savings approach is compatible with dynamic scheduling as well as control channel-less VoIP. Implementation is optional at each eNode B. UE devices need only support RRC signaling by being able to send RRC acknowledgement (e.g., layer 2 acknowledgements without a crash of the UE device for compatibility). The UE device does not have to comply with the flexible DRX upon reception of the L1/L2 control channel message.

As an estimate of the processing overhead, consider an implementation with a 5 MHz system and a 20 ms extended DRX cycle and a 48-bit L1/L2 control channel that support 32 UE devices per bitmap. With a code rate of ⅓, 144 symbols or 72 tones can be realized. Further consider a required Signal to Noise Plus Interference Ratio (SNIR) per tone of −3 dB in order to target about 90% of the UE devices. The overhead per L1/L2 control channel is thus $1/(14\times4\times20)=0.1\%$. It can be shown thus that for 160 UE devices, the overhead is about 0.5%, for 320 UE devices the overhead is about 1%, and for 480 UE devices the overhead is about 1.5%.

Consider a 20 ms extended DRX cycle with control channel-less mode with 5 ms retransmissions. DRX power savings are obtained in 20 ms intervals when no data is scheduled, which thus entails about 50% without frame bundling and about 75% with frame bundling. Assuming that the UE devices is awake only one of four slots (i.e., every 20 ms rather than every 5 ms), then dynamic DRX cycle reduces power consumption due to reception by 75%. Total power savings due to DRX without accounting for transmission power consumption is about 37% without frame bundling and about 56% with frame bundling.

In addition, flexible DTX power savings are obtain in 20 ms interval when DL-SCH is not scheduled. An opportunity exists to gate off the PUCCH, with a corresponding reduction in interference and allowing the UE device to transition into sleep as soon as DRX indicator channel (DICH) is transmitted. With flexible DTX, PUCCH slots can be reused for data. When channel quality indocator is mapped on Uplink schared channel (UL-SCH), blind decoding at eNode B can be performed.

In considering delay impacts, flexible DTX-DRX has particular advantages for VoIP service. During periods of inactivity, new arrivals are delayed by on average one half of extended DRX period, typically 10 ms, which is larger than one half of the nominal DRX period, which is typically then 5 ms. For many implementations this additional delay is not significant, especially in order to realize the power savings and other benefits. The delay can be cut in half by doubling overhead. It should be appreciated that flexible DTX-DRX is useful for other traffic.

Figure 7:
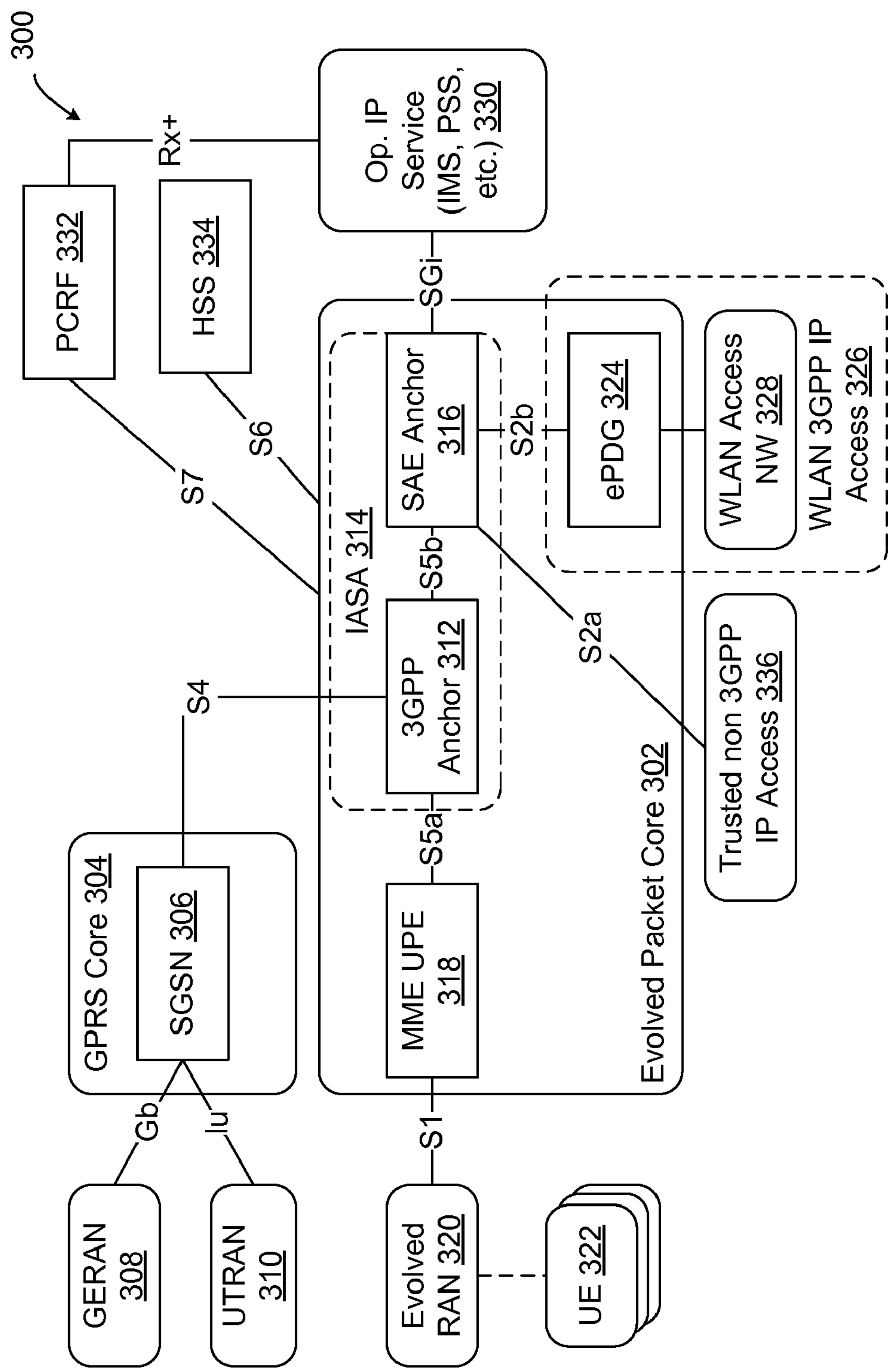
FIG. 7 illustrates a diagram of a communication system incorporating a legacy General Packet Radio Service (GPRS) core and an evolved packet core supporting flexible DRX power savings.

In FIG. 7, in another aspect, a communication system 300 that can encompass the communication system 110 of FIG. 2 includes support for interfacing an evolved packet core 302 via an interface S4 with a legacy General Packet Radio Service (GPRS) core 304, whose Serving GPRS Support Node (SGSN) 306 is interfaced in turn by a Gb interface to a Global System for Mobile Communications (GSM)/Edge Radio Access Network (GERAN) 308 and via an Iu interface to a UTRAN 310. The S4 provides the user plane with related control and mobility support between GPRS Core 304 and a 3GPP Anchor 312 of an Inter Access Stratum Anchor (IASA) 314 and is based on a Gn reference point as defined between SGSN 306 and Gateway GPRS Serving/Support Node (GGSN) (not shown). The IASA 314 also includes a system architecture evolved (SAE) anchor 316 interfaced to the 3GPP anchor 312 by an S5b interface that provides the user plane with related control and mobility support. The 3GPP anchor 312 communicates with an MME UPE 318 via interface S5a. Mobility Management entity (MME) pertains to distribution of paging messages to one or more eNode B the and User Plane Entity (UPE) pertains to IP header compression and encryption of user data streams, termination of U-plane packets for paging reasons, and switching of U-plane for support of UE mobility. The MME UPE 318 communicates via interface S 1 to an evolved RAN 320 for wirelessly communicating with UE devices 322.

An S2b interface provides the user plane with related control and mobility support between the SAE Anchor 316 and an evolved Packet Data Gateway (ePDG) 324 of a wireless local access network (WLAN) 3GPP IP Access component 326 that also includes a WLAN Access network (NW) 328. An SGi interface is the reference point between the Inter AS Anchor 316 and a packet data network 330. Packet data network 330 may be an operator external public or private packet data network or an intra operator packet data network, e.g. for provision of IP Multimedia Subsystem (IMS) services. This SGi reference point corresponds to Gi and Wi functionalities and supports any 3GPP and non-3 GPP access systems. An Rx+interface provides communication between the packet data network 330 and a policy and charging rules function (PCRP) 332, which in turn communicates via an S7 interface to the evolved packet core 302. The S7 interface provides transfer of Quality of Service (QoS) policy and charging rules from PCRF 332 to Policy and Charging Enforcement Point (PCEP) (not shown). An S6 interface (i.e., AAA interface) enables transfer of subscription and authentication data for authenticating/authorizing user access by interfacing the evolved packet core 302 to a home subscriber service (HSS) 334. An S2a interface provides the user plane with related control and mobility support between a trusted non 3GPP IP access 336 and the SAE Anchor 316.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems; time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed, by the $N_T$ transmit and $N_R$ receive antennas may be decomposed into $N_S$ independent channels, which are also referred to as spatial channels, where $N_S \leqq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 8:
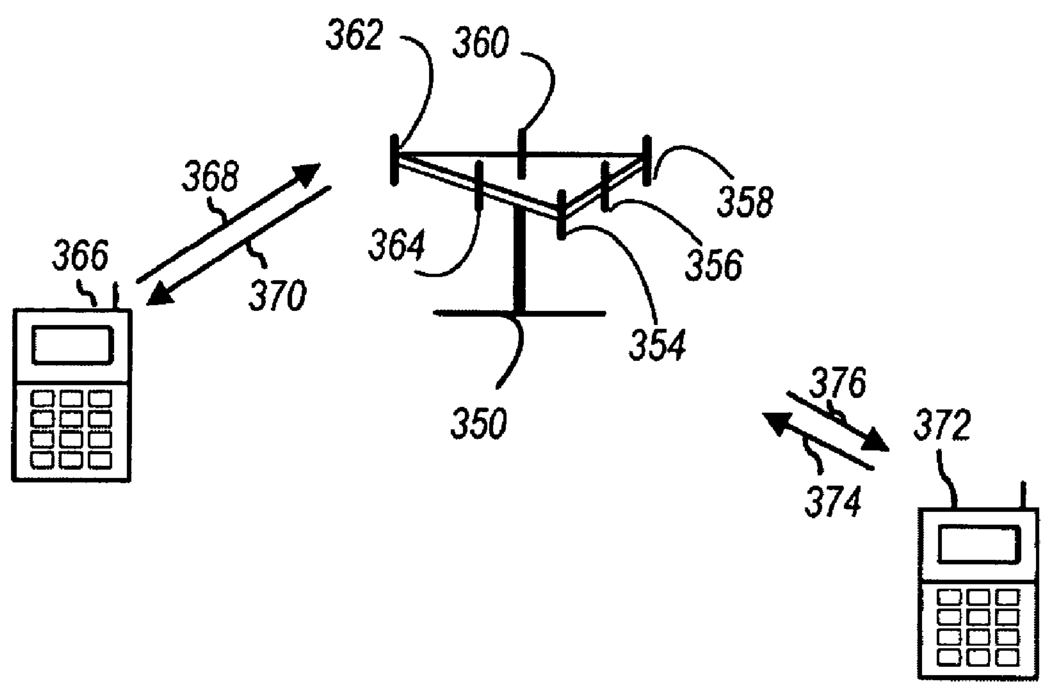
FIG. 8 illustrates a diagram of a multiple access wireless communication system according to one aspect for supporting flexible DRX.

Referring to FIG. 8, a multiple access wireless communication system according to one aspect is illustrated. An access point 350 (AP) includes multiple antenna groups, one including 354 and 356, another including 358 and 360, and an additional including 362 and 364. In FIG. 8, only two antennas are shown for each antenna group, however, more or fewer antennas may be utilized for each antenna group. Access terminal 366 (AT) is in communication with antennas 362 and 364, where antennas 362 and 3.64 transmit information to access terminal 366 over forward link 370 and receive information from access terminal 366 over reverse link 368. Access terminal 372 is in communication with antennas 356 and 358, where antennas 356 and 358 transmit information to access terminal 372 over forward link 376 and receive information from access terminal 372 over reverse link 374. In a FDD system, communication links 368, 370, 374 and 376 may use different frequency for communication. For example, forward link 370 may use a different frequency then that used by reverse link 368.

Each group of antennas and/or the area in which they are designed to communicate is often referred to as a sector of the access point. In the aspect, antenna groups each are designed to communicate to access terminals in a sector, of the areas covered by access point 350.

In communication over forward links 370 and 376, the transmitting antennas of access point 350 utilize beamforming in order to improve the signal-to-noise ratio of forward links for the different access terminals 366 and 372. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 9:
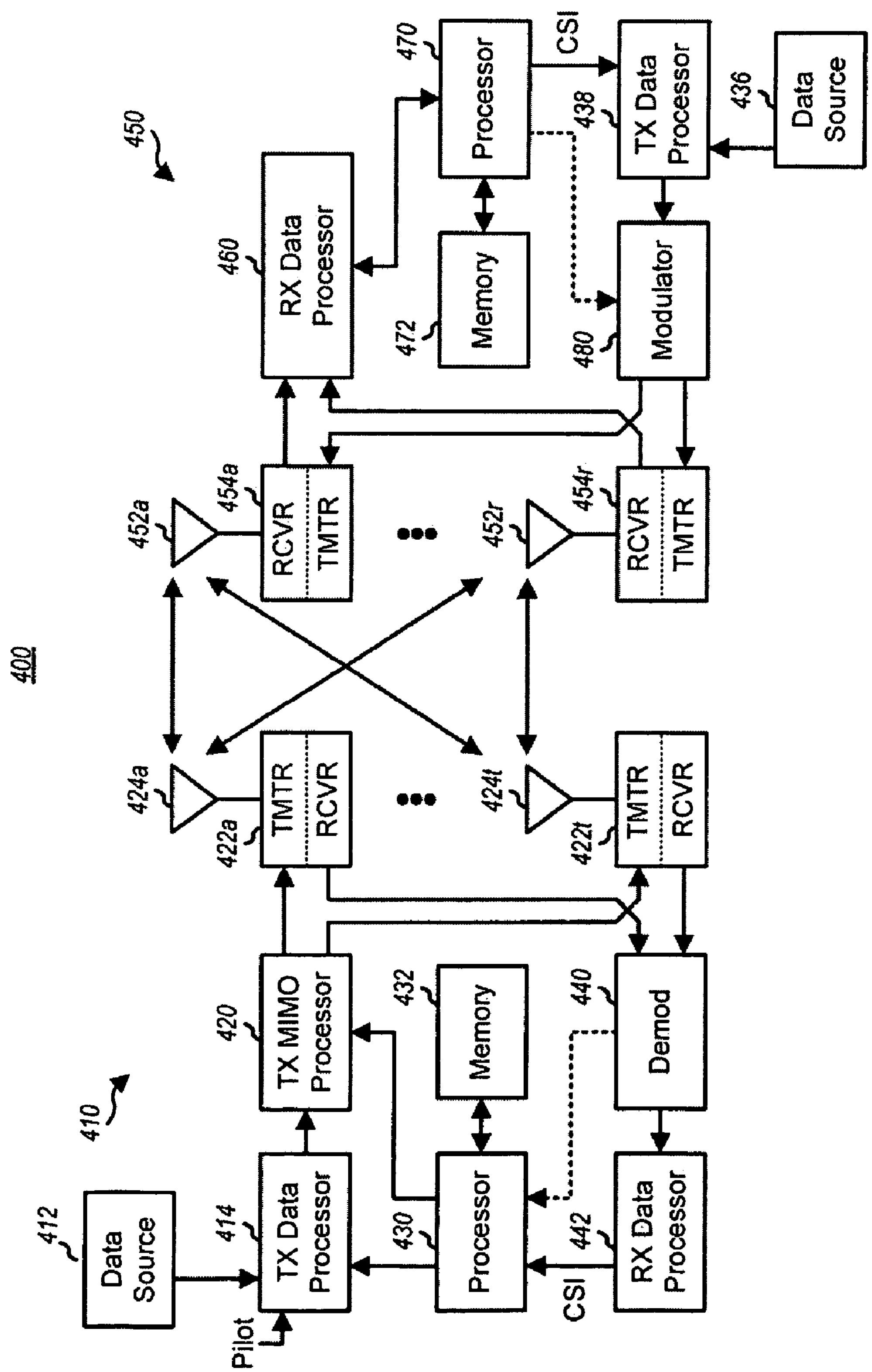
FIG. 9 illustrates a schematic block diagram of a communication system for supporting flexible DRX.

FIG. 9 is a block diagram of an aspect of a transmitter system 410 (also known as the access point) and a receiver system 450 (also known as access terminal) in a MIMO system 400. At the transmitter system 410, traffic data for a number of data streams is provided from a data source 412 to a transmit (TX) data processor 414.

In an aspect, each data stream is transmitted over a respective transmit antenna. TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 430.

The modulation symbols for all data streams are then provided to a TX MEMO processor 420, which may further process the modulation symbols (e.g., for OFDM). TX MIMO processor 420 then provides $N_T$ modulation symbol streams to $N_T$ transmitters (TMTR) 422*a* through 422*t*. In certain implementations, TX MIMO processor 420 applies beamforming weights to the symbols of the data streams and to the antenna from which the symbol is being transmitted.

Each transmitter 422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 422*a* through 422*t* are then transmitted from $N_T$ antennas 424*a* through 424*t*, respectively.

At receiver system 450, the transmitted modulated signals are received by $N_R$ antennas 452*a* through 452*r* and the received signal from each antenna 452 is provided to a respective receiver (RCVR) 454*a* through 454*r*. Each receiver 454 conditions (e.g., filters, amplifies, and downconverts) a respective received signal, digitizes the conditioned signal to provide samples, and further processes the samples to provide a corresponding "received" symbol stream.

An RX data processor 460 then receives and processes the $N_R$ received symbol streams from $N_R$ receivers 454 based on a particular receiver processing technique to provide $N_T$ "detected" symbol streams. The RX data processor 460 then demodulates, deinterleaves, and decodes each detected symbol stream to recover the traffic data for the data stream. The processing by RX data processor 460 is complementary to that performed by TX MIMO processor 420 and TX data processor 414 at transmitter system 410.

A processor 470 periodically determines which pre-coding matrix to use (discussed below). Processor 470 formulates a reverse link message comprising a matrix index portion and a rank value portion.

The reverse link message may comprise various types of information regarding the communication link and/or the received data stream. The reverse link message is then processed by a TX data processor 438, which also receives traffic data for a number of data streams from a data source 436, modulated by a modulator 480, conditioned by transmitters 454*a* through 454*r*, and transmitted back to transmitter system 410.

At transmitter system 410, the modulated signals from receiver system 450 are received by antennas 424, conditioned by receivers 422, demodulated by a demodulator 440, and processed by a RX data processor 442 to extract the reserve link message transmitted by the receiver system 450. Processor 430 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Channel (DL-SCH) and a Paging Channel (PCH), the PCH for support of UE power saving (DRX cycle is indicated by the network to the UE), broadcasted Over entire cell and mapped to PHY resources which can be used for other control/traffic channels. The UL Transport Channels comprises a Random Access Channel (RACH), and Uplink Shared Channel (UL-SCH) and plurality of PHY channels. The PHY channels comprise a set of DL channels and UL channels.

The DL PHY channels comprises Physical broadcast channel (PBCH):

- The coded BCH transport block is mapped to four subframes within a 40 ms interval;
- 40 ms timing is blindly detected, i.e. there is no explicit signaling indicating 40 ms timing;
- Each sub frame is assumed to be self-decodable, i.e the BCH can be decoded from a single reception, assuming sufficiently good channel conditions.

Physical control format indicator channel (PCFICH):

- Informs the UE about the number of OFDM symbols used for the PDCCHs;
- Transmitted in every subframe. Physical downlink control channel (PDCCH):
- Informs the UE about the resource allocation of PCH and DL-SCH, and Hybrid ARQ information related to DL-SCH;
- Carries the uplink scheduling grant. Physical Hybrid ARQ Indicator Channel (PHICH):
- Carries Hybrid ARQ ACK/NAKs in response to uplink transmissions. Physical downlink shared channel (PDSCH):
- Carries the DL-SCH and PCH. Physical multicast channel (PMCH):
- Carries the MCH.

Physical uplink control channel (PUCCH):

- Carries Hybrid ARQ ACK/NAKs in response to downlink transmission;
- Carries Scheduling Request (SR);
- Carries CQI reports. Physical uplink shared channel (PUSCH):
- Carries the UL-SCH. Physical random access channel (PRACH):
- Carries the random access preamble.

In an aspect, a channel structure is provided that preserves low peak-to-average (PAR) (i.e., at any given time, the channel is contiguous or uniformly spaced in frequency) properties of a single carrier waveform.

Figure 10:
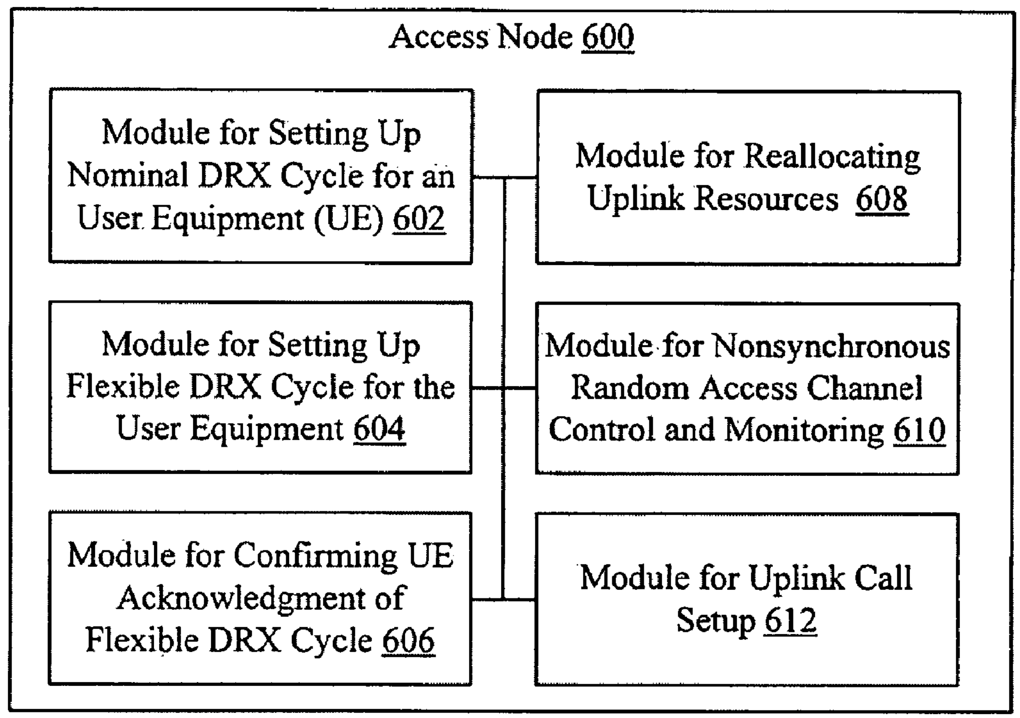
FIG. 10 illustrates a block diagram for an access node having modules for controlling discontinuous transmission/reception by an access terminal.

In FIG. 10, an access node 600 includes means, depicted as a module 602, for setting up nominal DRX cycle for a user equipment (UE). The access node 600 includes means, depicted as a module 604, for setting up flexible DRX cycle (e.g., off patterns) for the user equipment. The access node 600 includes means, depicted as a module 606, for confirming that the AT has acknowledged the flexible DRX cycle. The access node 600 includes means, depicted as a module 608, for reallocating uplink resources implicitly relinquished by the AT. The access node 600 includes means, depicted as a module 610, for nonsynchronous random access channel (RACH) control and monitoring. The access node 600 includes means, depicted as a module 612, for uplink call setup.

Figure 11:
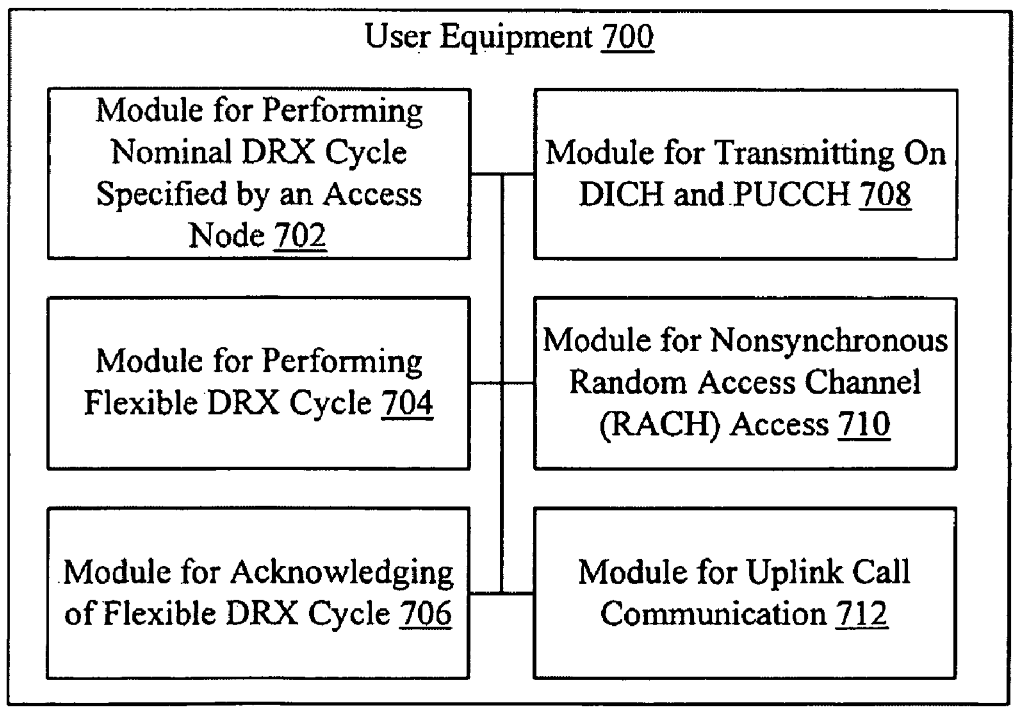
FIG. 11 illustrates a block diagram for an access terminal having modules for performing discontinuous transmission/reception in response to an access node.

In FIG. 11, an user equipment 700 includes means, depicted as a module 702, for performing nominal DRX cycle specified by an Access Node, or as a default. The user equipment 700 includes means, depicted as a module 704, for performing a flexible DRX cycle (e.g., off patterns) when directed by the access node. The user equipment 700 includes means, depicted as a module 706, for acknowledging the flexible DRX cycle to the access node. The user equipment 700 includes means, depicted as a module 708, for transmitting on DRX indicator channel (DICH) and PUCCH to maintain synchronization and closed loop power control, which can also include selectively communicating DRX indicator channel (DICH) only to reduce power of transmissions during flexible discontinuous transmission (DTX). The user equipment 700 includes means, depicted as a module 710, for nonsynchronous RACH access. The user equipment 700 includes means, depicted as a module 712 for uplink call communication once setup via the RACH.

Figure 12:
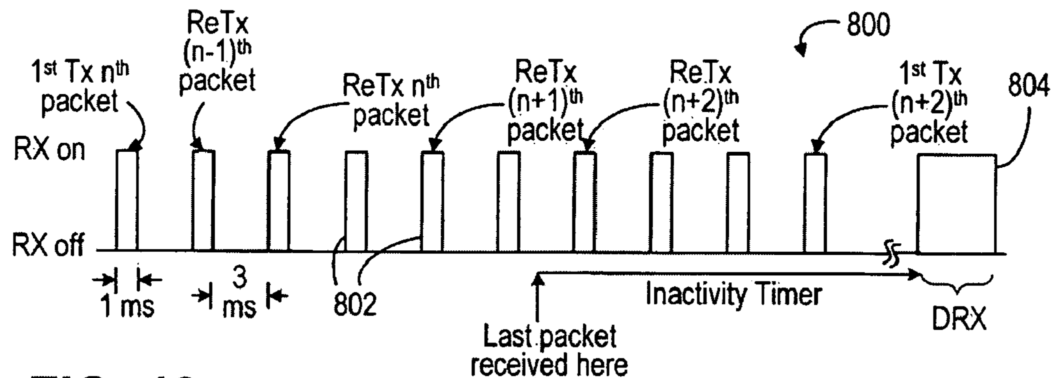
FIG. 12 illustrates a timing diagram for a DRX pattern with an illustrative 8 Hybrid Automatic-Repeat-Request (HARQ) interlaces.

In FIG. 12, a DRX pattern 800 depicts a UE that responds to receiving data during DRX (i.e., transmission on the control channel) by transitioning to continuous reception. In an illustrative pattern 800 having eight HARQ interlace Rx-on pulses 802 of 1 ms duration spaced by 3 ms intervals followed by a DRX period 804. A first pulse is depicted as "$1^{st}$ Tx nth packet", followed by a retransmission (ReTx) $(n-1)^{th}$ packet, a ReTx $n^{th}$ packet, and a ReTx $(n+1)^{th}$ packet. The latter is annotated as being when a last packet is received by the UE followed by an inactivity timer during four pulses followed by the DRX pulse 804. The four pulses include the first being depicted as ReTx $(n+2)^{th}$ packet and the fourth being labeled as $1^{st}$ Tx $(n+2)^{th}$ packet However, such an implementation may not be desirable for certain types of communication such as VoIP. In particular, such low data rate source typically can be scheduled on a single HARQ process only. The timer value that can be utilized to transition back to DRX mode would likely be longer than the inter-arrival time between the two VoIP packets, practically disabling battery savings mode. Moreover, the UE is required to remain active and prepare for reception of on all HARQ processes, even though it is only scheduled on only one.

Figure 13:
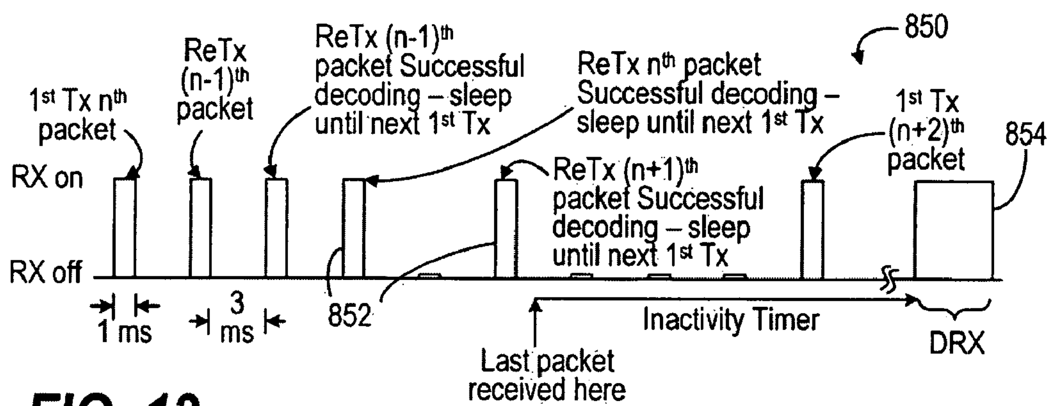
FIG. 13 illustrates a timing diagram for a DRX pattern with an illustrative 8 HARQ interlaces with early termination sleep mode.

In FIG. 13, a DRX pattern 850 advantageously takes advantage of being scheduled on only a single HARQ process. The illustrative eight HARQ interlace reception pulses 852 are followed by a DRX period 854. After a $1^{st}$ Tx $n^{th}$ packet and a ReTx $(n-1)^{th}$ packet, a third and fourth Rx-on pulses are depicted as ReTx $(n-1)^{th}$ and $n^{th}$ packets, respectively, whereafter successful decoding can sleep until next $1^{st}$ Tx. After a Rx off during the next three HARQ intervals, a next Rx-on pulse is depicted as $1^{st}$ Tx $(n+2)^{th}$ packet.

Figure 14:
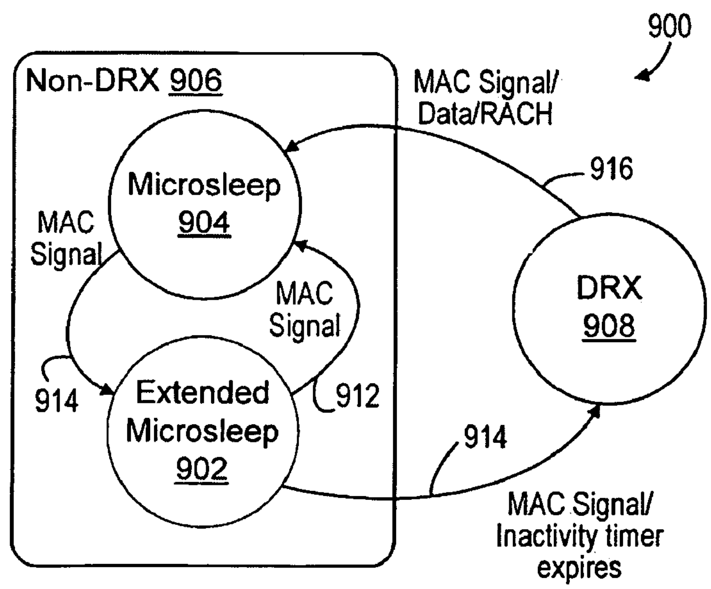
FIG. 14 illustrates a state diagram for non-DRX and DRX modes.

In FIG. 14, diagram 900 illustrates that the UE maximizes the potential for additional battery power savings through extended microsleep mode 902 being used as well as nominal microsleep mode 904 during the "on-duration" 906 interspersed with the DRX mode 908. The eNode B utilizes MAC signaling to configures the extended microsleep of FIG. 14 from the nominal microsleep pattern of FIG. 14 of 1 ms Rx on and 3 ms Rx off. In addition, the UE initiates an inactivity timer when data is not received during non- DRX for a preconfigured time in order to self-initiate DRX mode. The physical layer supports the nominal microsleep mode wherein the UE goes into sleep in the later part of the 1 ms TTI if the UE could not find any L1/L2 control channel directed to it in the first 3 OFDM symbols, which can be referred to as continuous reception. This extended microsleep mode 902 extends this microsleep beyond 1 TTI.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the evolved RAN (e.g., access point, eNode B) can infer or predict data traffic conditions and opportunities for flexible DTX-DRX and make determinations of an implicit relinquishing of CQI resources by a UE device based on previous interactions with the same or like machines under similar conditions.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein.

Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicidy set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for reducing power consumption by varying user equipment discontinuous communication of reception on a downlink channel or transmission on an uplink channel with a base node, comprising:

specifying on a downlink channel a changed interval for discontinuous communication scheduling for a user equipment;

participating in communication with the user equipment following the changed interval at a nominal interval automatically reverted to by the user equipment; and commanding extended microsleep in response to a low data rate downlink data transmission allowing the user equipment to enter extended microsleep.

2. The method of claim 1, wherein the changed interval is a longer interval than a nominal discontinuous reception cycle.

3. The method of claim 2, wherein the changed interval is a multiple of the nominal discontinuous reception cycle.

4. The method of claim 3, wherein discontinuous transmission by the user equipment is changed in alignment with discontinuous reception.

5. The method of claim 1, in which commanding extended microsleep comprises commanding extended microsleep upon decoding a data transmission without receiving a redundant retransmission; and the method further comprising sending an interleaved sequence of hybrid automatic repeat request downlink transmissions and retransmission to the user equipment.

6. The method of claim 1, further comprising recognizing ongoing nominal DRX by monitoring radio resource control (RRC) signaling from a user equipment that is not configured for flexible DRX.

7. The method of claim 1, further comprising transmitting the flexible DRX interval to the user equipment over a physical downlink control channel (PDCCH).

8. The method of claim 1, further comprising defining a flexible DRX interval in terms of an upload reference signal interval and offset for paging indication channel (PICH) interval and Physical uplink control channel (PUCCH) interval.

9. The method of claim 1, further comprising performing open loop power control on downlink transmission to the user equipment, the user equipment infrequently reporting channel quality indications during flexible DRX.

10. A computer program product for reducing power consumption by varying user equipment discontinuous communication of reception on a downlink channel or transmission on an uplink channel with a base node, comprising:

a non-transitory computer-readable medium, comprising:

a first set of codes configured to cause a computer to specify on a downlink channel a changed interval for a discontinuous communication scheduling for a user equipment;

a second set of codes configured to cause the computer to participate in communication with the user equipment following the changed interval at a nominal interval automatically reverted to by the user equipment; and a third set of codes configured to command extended microsleep in response to a low data rate downlink data transmission allowing the user equipment to enter extended microsleep.

11. A method for reducing power consumption by varying user equipment discontinuous communication of reception on a downlink channel or transmission on an uplink channel with a base node, comprising:

receiving on a downlink channel a changed interval for a discontinuous communication scheduling for a user equipment;

automatically reverting to a nominal communication interval following the changed interval; and receiving a command for extended microsleep in response to a low data rate downlink data transmission.

12. The method of claim 11, wherein the changed interval is a longer interval than a nominal discontinuous reception cycle.

13. The method of claim 12, wherein the changed interval is a multiple of the nominal discontinuous reception cycle.

14. The method of claim 13, wherein discontinuous transmission by the user equipment is changed in alignment with discontinuous reception.

15. The method of claim 11, further comprising:

receiving an interleaved sequence of hybrid automatic repeat request downlink transmissions and retransmission by the user equipment; and entering extended microsleep upon decoding a data transmission without receiving a redundant retransmission.

16. The method of claim 11, further comprising utilizing radio resource control (RRC) signaling to indicate noncompliance with the commanded changed interval when not configured for flexible DRX.

17. The method of claim 11, further comprising receiving the flexible DRX interval to the user equipment over a physical downlink control channel (PDCCH).

18. The method of claim 11, further comprising receiving a definition for a flexible DRX interval in terms of an upload reference signal interval and offset for paging indication channel (PICH) interval and Physical uplink control channel (PUCCH) interval.

19. The method of claim 11, further comprising receiving open loop power control on downlink transmission to the user equipment, the user equipment infrequently reporting channel quality indications during flexible DRX.

20. A computer program product for reducing power consumption by varying user equipment discontinuous communication of reception on a downlink channel or transmission on an uplink channel with a base node, comprising:

a non-transitory computer-readable medium, comprising:

a first set of codes configured to cause a computer to receive on a downlink channel a changed interval for a discontinuous communication scheduling for a user equipment;

a second set of codes configured to cause the computer to automatically reverting to a nominal communication interval following the changed interval; and a third set of codes configured to receive a command for extended microsleep in response to a low data rate downlink data transmission.

* * * * *